US008972517B2

(12) United States Patent
Black et al.

(10) Patent No.: US 8,972,517 B2
(45) Date of Patent: Mar. 3, 2015

(54) METHOD AND APPARATUS FOR MAINTAINING AND MIGRATING A DISTRIBUTED CACHE IN A NETWORKED ENVIRONMENT

(75) Inventors: Jonathan J. Black, Ocean, NJ (US); Pramod B. Kaluskar, Edison, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 242 days.

(21) Appl. No.: 13/456,113

(22) Filed: Apr. 25, 2012

(65) Prior Publication Data

US 2012/0271904 A1 Oct. 25, 2012

Related U.S. Application Data

(60) Provisional application No. 61/478,592, filed on Apr. 25, 2011.

(51) Int. Cl.
*G06F 15/167* (2006.01)
*H04L 29/08* (2006.01)
*G06F 17/30* (2006.01)

(52) U.S. Cl.
CPC ............ *H04L 67/06* (2013.01); *H04L 67/2842* (2013.01); *H04L 67/289* (2013.01); *G06F 17/30902* (2013.01)
USPC ...................................................... 709/214

(58) Field of Classification Search
CPC ......... H04L 67/1097; H04L 67/2842–67/2857
USPC ................... 709/214; 711/119–122, 141–146
See application file for complete search history.

(56) References Cited

U.S. PATENT DOCUMENTS

| 5,870,552 | A | * | 2/1999 | Dozier et al. ................ 709/219 |
| 5,878,410 | A | * | 3/1999 | Zbikowski et al. ................... 1/1 |
| 6,167,438 | A | * | 12/2000 | Yates et al. .................... 709/216 |
| 6,205,481 | B1 | * | 3/2001 | Heddaya et al. .............. 709/226 |
| 6,263,402 | B1 | * | 7/2001 | Ronstrom et al. ............. 711/131 |
| 6,442,601 | B1 | * | 8/2002 | Gampper et al. ............. 709/218 |
| 6,760,756 | B1 | * | 7/2004 | Davis et al. ................... 709/215 |
| 6,917,960 | B1 | * | 7/2005 | Decasper et al. ............. 709/203 |
| 7,146,429 | B2 | * | 12/2006 | Michel .......................... 709/238 |
| 7,159,103 | B2 | * | 1/2007 | Ahmad et al. ................ 712/241 |
| 7,299,271 | B2 | | 11/2007 | Sato |
| 7,814,483 | B2 | | 10/2010 | Li et al. |
| 8,195,878 | B2 | * | 6/2012 | Mittendorff et al. .......... 711/118 |
| 2002/0133570 | A1 | * | 9/2002 | Michel .......................... 709/219 |

(Continued)

FOREIGN PATENT DOCUMENTS

KR 10-2005-0119400 A 12/2005
WO WO 2005/048011 A2 11/2003

OTHER PUBLICATIONS

International Search Report and Written Opinion issued Oct. 29, 2012 for PCT/US2012/035031.

*Primary Examiner* — Lance L Barry
(74) *Attorney, Agent, or Firm* — Pillsbury Winthrop Shaw & Pittman LLP

(57) ABSTRACT

In general, methods and apparatus according to the invention mitigate these and other issues by implementing caching techniques described herein. So when one device in a home network downloads and plays a particular content (e.g., a video, song) from a given site, the content is cached within the network such that the same content is available to be re-played on another device without re-downloading the same content from the Internet.

18 Claims, 6 Drawing Sheets

(56) References Cited

U.S. PATENT DOCUMENTS

| | | | |
|---|---|---|---|
| 2002/0147887 A1* | 10/2002 | Copeland et al. | 711/118 |
| 2003/0191812 A1* | 10/2003 | Agarwalla et al. | 709/217 |
| 2010/0312861 A1* | 12/2010 | Kolhi et al. | 709/219 |
| 2011/0040893 A1* | 2/2011 | Karaoguz et al. | 709/242 |
| 2011/0082924 A1 | 4/2011 | Gopalakrishnan | |
| 2011/0107030 A1* | 5/2011 | Borst et al. | 711/118 |
| 2011/0277001 A1 | 11/2011 | Kaluskar | |
| 2012/0254116 A1* | 10/2012 | Thereska et al. | 707/640 |
| 2012/0271904 A1* | 10/2012 | Black et al. | 709/213 |

* cited by examiner

METHOD AND APPARATUS FOR MAINTAINING AND MIGRATING A DISTRIBUTED CACHE IN A NETWORKED ENVIRONMENT

CROSS-REFERENCE TO RELATED APPLICATIONS

The present application claims priority to U.S. Provisional Application No. 61/478,592 filed Apr. 25, 2011, the contents of which are incorporated herein by reference in its entirety.

FIELD OF THE INVENTION

The present invention relates generally to local area networks, and more particularly to caching techniques in a networked environment such as a local or home network.

BACKGROUND OF THE INVENTION

Over the years, home networks have grown in size and complexity. Today, there are typically multiple devices within the same home that are capable of playing/displaying the same type of content (e.g., one can watch an online video either on the computer, on an iPhone or on the TV, one can listen to music either on the computer, an iPhone or on a dedicated internet-radio box). Each of these devices is capable of downloading content from the Internet and playing it, often through a home Wi-Fi network. The content may also be played from in-home devices (e.g., a DLNA media-player or an MP3 repository).

Generally, when a device such as a personal computer, tablet, smart phone (e.g. iPhone), etc. plays or displays content, the content is downloaded from the Internet onto that specific device in cases where the content is not stored locally on a storage medium. For example, an individual wanting to watch a particular video clip on the YouTube® website four times will typically have to download/stream the video from the YouTube® website four times if the individual wishes to watch the video clip on four different devices.

From an end-customer point of view, as service providers incorporate limits or caps on bandwidth utilization associated with network services, customers are becoming increasingly cautious regarding the amount of bandwidth consumed. Therefore, the need to re-download content from the Internet is becoming an increasing problem. Furthermore, from the perspective of service providers, the reduction in redundant network traffic (which currently occurs when the same content is downloaded by different in-home devices) is also desirable.

From a service provider view, there is an attempt move away from an all-you-can-eat service model toward a cost-per-downloaded-byte model. Additionally, there is an attempt to discourage redundant network traffic. From a service provider perspective, both can be accomplished by incorporating a monthly ceiling on data downloads, whereby the consumer experiences reduced download speeds or is unable to download any additional content altogether when a ceiling is reached. In such cases, downloading the same content/file multiple times means that the user's monthly quota is depleted unnecessarily Furthermore, the fact that the same content/file is being re-downloaded means that network bandwidth is being consumed in order to carry the same content multiple times, thereby unnecessarily increasing network loading and congestion, which service providers seek to avoid.

Accordingly, there is a need for techniques to reduce network bandwidth associated with redundant network access of data.

SUMMARY OF THE INVENTION

In general, methods and apparatus according to the invention mitigate these and other issues by implementing caching techniques described herein. So when one device in a home network downloads and plays a particular content (e.g., a video, song) from a given site, the content is cached within the in-home network such that the same content is available to be re-played on another device without re-downloading the same content from the Internet.

In various embodiments, either a centralized or distributed caching scheme is implemented. The device may comprise a memory (either on-chip, on-board, or on-disk) such that the device can determine whether to download the content from the Internet or read the desired content from the cache within the required time limit. One or more devices stores a table of contents associated with the content in the cache. Example methods according to the invention comprise receiving a request to download multimedia content from the Internet. This request may be made by any of the in-home devices using any of the existing (or a completely new) mechanism. Prior to downloading the requested content from the Internet, a determination is made as to whether the requested content is available in a cache within the in-home network. In response to the request, the requested content is provided from either a cache in the in-home network or from the Internet. The caching algorithm used to determine whether the requested content is available within the in-home network may be based on either a centralized or distributed caching scheme.

In accordance with these and other aspects, a method implemented in an in-home network according to embodiments of the invention includes receiving a request to download content from the Internet, prior to downloading the requested content from the Internet, determining whether the requested content is available in a cache within the in-home network, and in response to the request, providing the requested content from one of the cache in the in-home network or from the Internet.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

Figure 1:
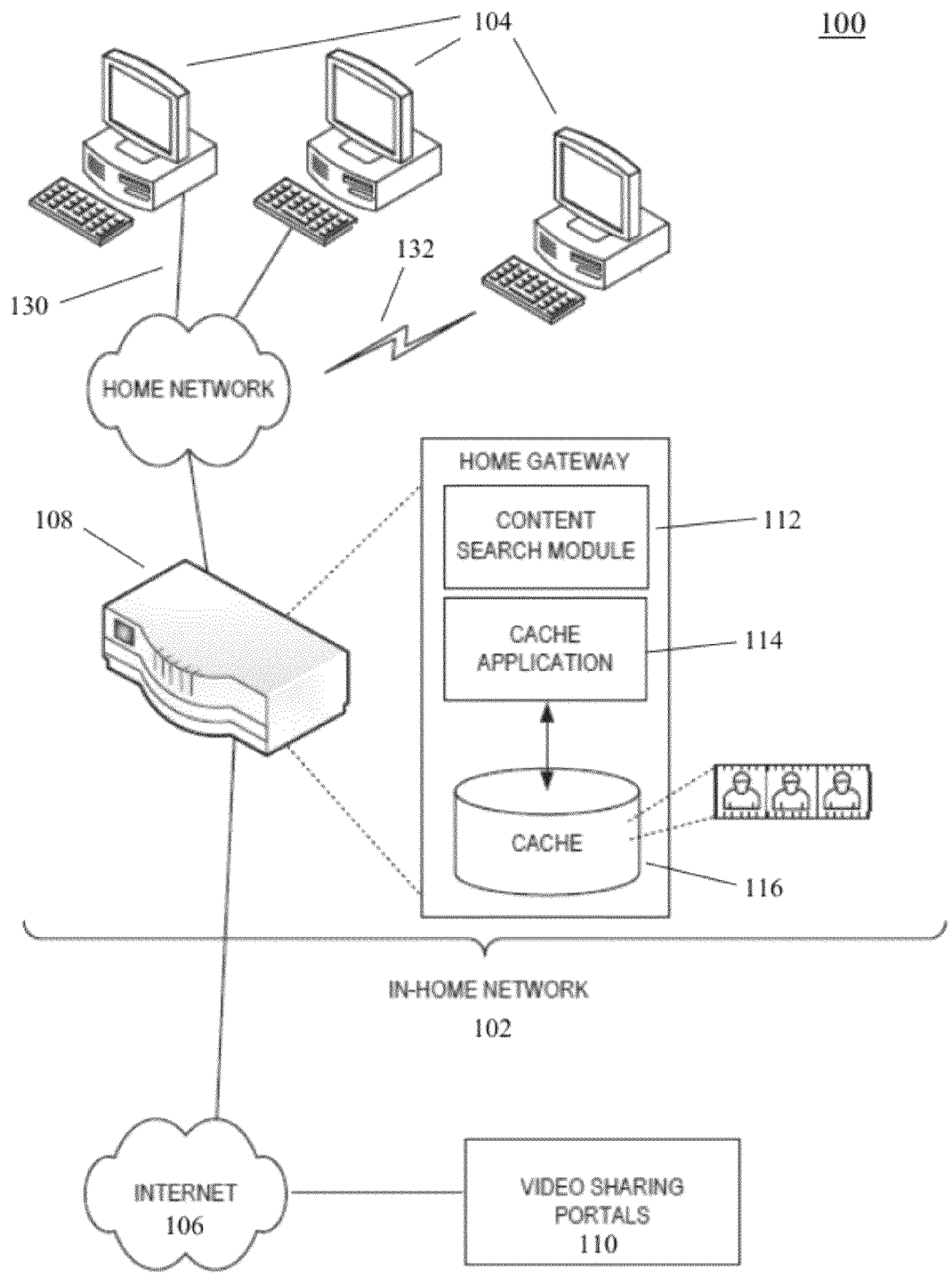
FIG. 1 is a block diagram of an example home network implementing centralized caching techniques according to embodiments of the invention.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In the context of this disclosure, an "in-home network" generally refers to any type of distributed communications, computing, and storage components that make up a networked environment associated with a home or small office. Various embodiments are described for caching content within the in-home network, where the cached content comprises files, multimedia content, and other types of data. Although the invention will be described with particular reference to an in-home network implementation, the principles of the invention are not limited to a single home or office environment, but can be extended to other types of environments as will be appreciated by the descriptions below.

Embodiments of a caching method and apparatus according to the invention include at least two general implementations: centralized and distributed. In a centralized implementation, a cache is implemented on a home gateway (HGW) or similar device. A lookup table or index may also be incorporated in the on-chip/on-board memory that indicates to the HGW whether the required content is available in the cache. In a distributed implementation, the caching scheme of the invention is implemented across various in-home devices (laptops, routers, repeaters, iPads, etc.). Some or all of the devices executes an instance of a cache-coherency application, which could be implemented using a client server scheme in relation to the cache application in the HGW, or implemented using a completely distributed model.

FIG. 1 is an embodiment of a networked environment 100 in which example centralized caching techniques according to the invention may be implemented. As shown, one or more devices 104 are connected in an in-home network 102, which provides access to the Internet 106 via the home gateway 108. Through the Internet, the users can download content from video sharing portals 110 such as YouTube® or other websites, as well as various other types of content, including text and multimedia content from various sites on the Internet.

Devices 104 can include personal computer devices such as laptops, desktops and tablet computers (e.g. iPad, Kindle, etc.) (as shown in FIG. 1), network ready phone devices such as smartphones (e.g. iPhones and Android phones), and can further include various other types of media devices such as network-capable TVs, Internet radio systems, gaming devices (e.g. Wii, Xbox, etc.), DVRs, etc. Devices 104 can further include other home network devices such as routers, repeaters, NAS drives, etc. The devices 104 may be connected to the home network 102 via a wired connection 130 (e.g. Ethernet, powerline, etc.) or wireless connection 132 (e.g. WiFi, Bluetooth, etc.).

Home gateway 108 can be incorporated or provided in a wired or wireless router such as those available from commercial vendors such as NetGear, Linksys, D-Link, Cisco, etc. Such router devices typically include conventional routing functionality that can be adapted to operate with the caching techniques of the present invention, as will be appreciated by those skilled in the art after being taught by the present examples.

It should be noted that home networks in which the present invention can be implemented further typically include an Internet access device (not shown) such as a DSL modem that can be further coupled to a carrier or provider network such as a cable or telephone network. In some embodiments where such devices include router functionality, gateway 108 can be incorporated in such devices. In other embodiments, gateway 108 and the Internet access device are implemented in separate devices. An example would be a service such as AirportExpress from Apple, which assumes a suitable modem (FiOS/DSL/other) which puts out an Ethernet interface.

As shown, according to caching embodiments of the invention, a home gateway 108 differs from a conventional home gateway in that it further comprises a content search module 112, a cache application 114, and a memory storage device 116 for caching content. In embodiments, storage device 116 is implemented in on-board memory such as flash/double data rate (DDR) memory. In additional or alternative embodiments, storage device 116 is implemented in an off-board high-speed device such as USB2.0/USB3.0/eSATA/or other type of disk storage connected to the gateway 108 device. Module 112 and cache application 114 can be implemented, for example, using conventional or proprietary router device software and/or firmware that has been supplemented with functionality as described herein.

In general, content search module 112 searches the contents of the cache in storage device 116 to determine if content that is being requested by devices 104 can be supplied from storage device 116 rather from the Internet. Further example implementation details of module 112 can be gleaned from the foregoing functional descriptions.

In general, cache application 114 controls at least the following aspects: 1) the amount of memory to be allocated to the cache; and 2) the content of the cache itself (whether based on a least recently used (LRU) cache algorithm, a most recently used (MRU) cache algorithm, or other cache algorithms). The cache application 114 is further configured to maintain an index of the content that is available in the device 116. Further example implementation details of application 114 can be gleaned from the foregoing functional descriptions.

An example index that can be maintained in cache application 114 is illustrated below.

| Description | Pointer in Cache | Metadata 1 | Metadata 2 |
| --- | --- | --- | --- |
| www.youtube.com/user/lady gagaofficial | 0x000010000000h | Format = MPEG, type = music video, title = "Paparazzi" | "lady gaga," 400 × 300 resolution |
| ... | ... | | |
| www.espn.com | 0x00002000000h | Format = H.271, type = news video, date = Jan. 21, 2012 | "sports center," "Jan. 21, 2012," 500 × 400 resolution |
| ... | ... | | |

As shown above, in one example implementation, each entry a cache index includes four different elements: a Description, a pointer, and two sets of metadata. The Description element is intended to allow cache application to perform a match between cached content and information in a request for new content received from device 104. In this example, Description typically includes a portion of a URL (e.g. www.youtube.com). One set of metadata may include one or more keywords that might appear in a request for content (e.g. "Lady Gaga"). Another set of metadata may include additional items or tags that can be included in a request (e.g. resolution of 400×300). The pointer element includes an address in storage device 116. In this example, the pointer is an actual memory address. However, many variations are possible, such as a file ID and path in a directory structure. The metadata includes additional information about the cached content that may be useful in providing a textual or other description of the cached content.

Figure 2:
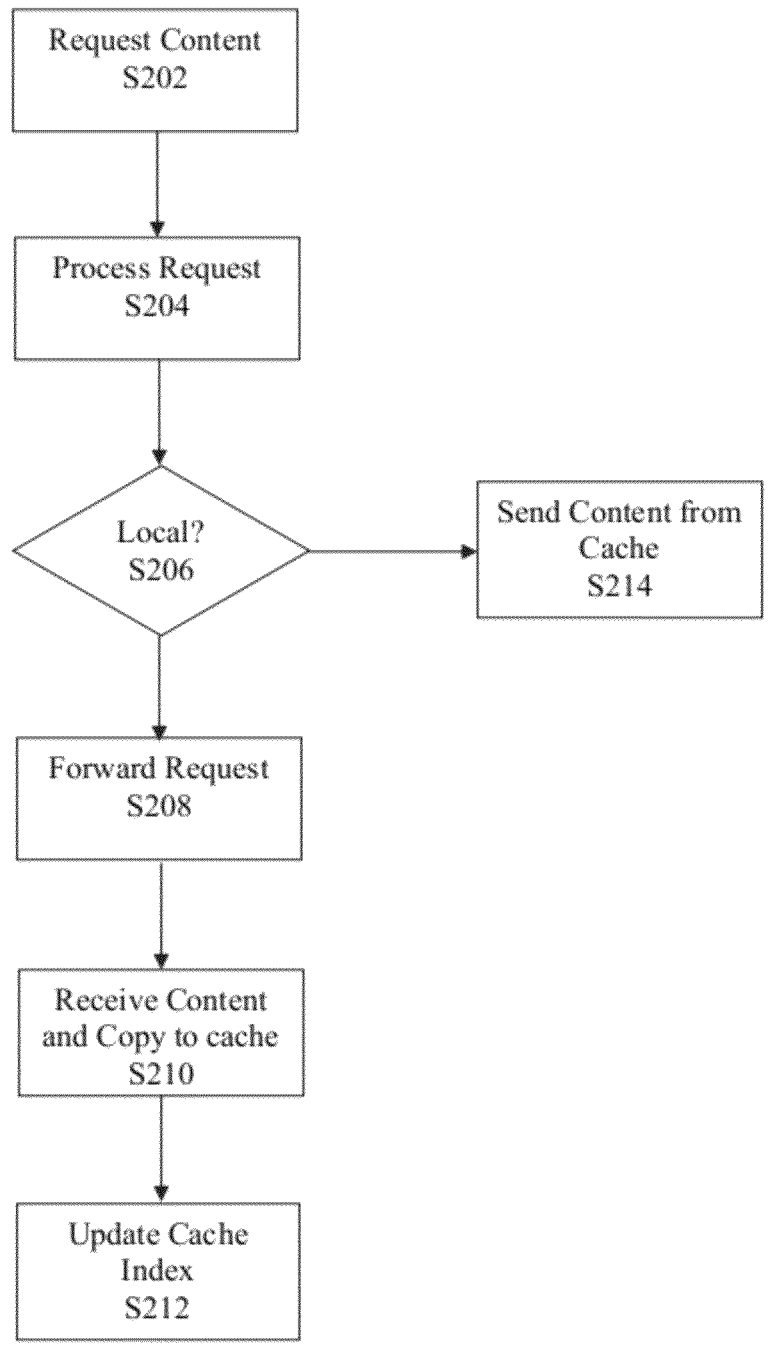
FIG. 2 is a flowchart illustrating an example centralized caching methodology according to embodiments of the invention.

FIG. 2 is a flowchart illustrating an example centralized caching methodology according to embodiments of the invention.

In step S202, a device 104 requests content. For example, where device 104 is a computer running a browser such as Internet Explorer, a request for content can be initiated by a user clicking a link on a web page such as a list of content on a page served by www.youtube.com. In response to the click, the browser application forms an IP request using the HTTP protocol and information from the link embedded in content such as HTML, and sends it to gateway 108. As another example, it may be "snooped" by an entity responsible for performing a lookup/learning of new entries in the cache. This functionality may be performed in the gateway/router. In step S204, the request is processed by the gateway using conventional routing techniques. For example, gateway 108 can look up an IP address associated with the request in a routing table and determine whether the request is associated with content on a remote network location. For all requests for content (determined in step S204) that need to be obtained from a remote source (e.g. a video from a public website such as YouTube), in step S206 search module 112 searches the cache device 116 to determine whether the requested content is stored in device 116.

If the requested content is not cached, the content is obtained in the conventional fashion by forwarding the request to the Internet in step S208. In step S210, when the content to be downloaded to the device 104 from the Internet is being streamed to the device 104 via gateway 108, the content is also copied to the cache in device 116 by application 114. When such complete, application 114 updates the cache index to reflect the newly stored content in step S212.

If it was instead determined in step S204 that the requested content is locally available, it is streamed to device 104 from cache device 116 by gateway 108 in step S214.

Figure 3:
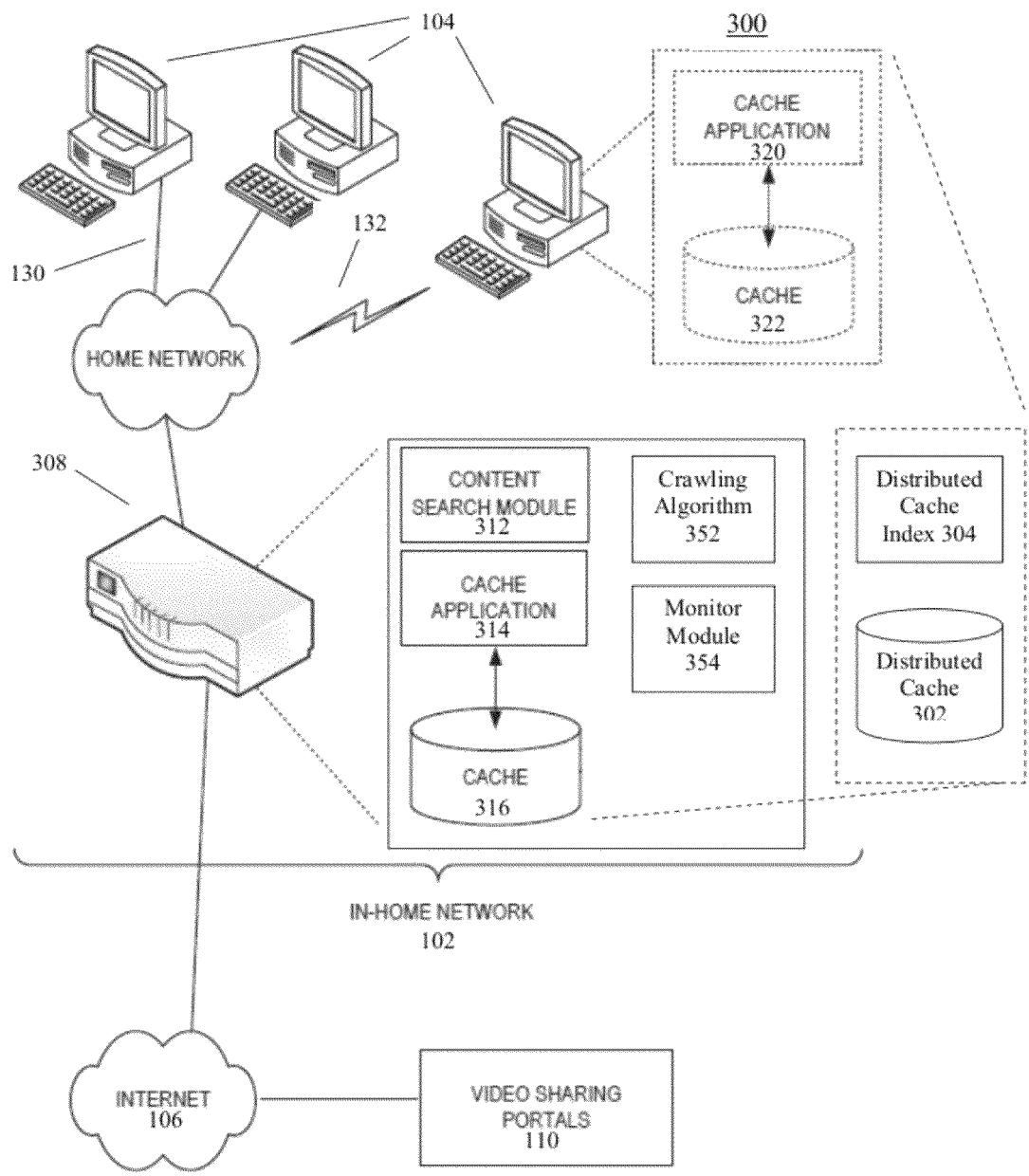
FIG. 3 is a block diagram of an example home network implementing distributed caching techniques according to embodiments of the invention.

FIG. 3 is an embodiment of a networked environment 300 in which example distributed caching techniques according to the invention may be implemented.

In contrast to the centralized implementation shown in FIG. 1, in the distributed implementation, one or more devices 104 is configured to execute a cache application 320 and maintain a local cache 322.

In embodiments where device 104 is a laptop or desktop computer running the Windows operating system, cache application 320 can be implemented by a device driver application or a browser plug-in application. For example, where device 104 includes a WiFi transceiver and when device 104 first attempts to establish a wireless connection with gateway 308, gateway 308 can automatically cause device 104 to download and install device driver software that includes cache application 320. As another example, the cache application may be pre-loaded on the device during manufacturing (part of the initial software that comes with the device). As yet another example, the cache application may be explicitly downloaded for that platform from the Internet—either manually (similar to manually downloading a driver for a new printer) or in response to auto-detecting support for "Caching Techniques" within the network (similar to a driver getting downloaded when a new printer is connected to a laptop). Those skilled in the art will recognize various alternative ways of implementing application 320, possibly depending on the type of device 104, after being taught by the present examples.

In general, cache application 320 includes functionality to manage the contents of cache 322, communicate with other cache instances via proprietary or other protocols, and maintain a cache index, either locally and/or shared with other cache instances. Implementation and other details of cache application 320 will become even more apparent to those skilled in the art after being taught by the following example methodologies according to the invention.

Cache 322 is implemented by memory that is or can be managed by device 104. For example, where device 104 is a personal computer (e.g. laptop or desktop) running Windows operating system and Internet Explorer software, cache 322 can be implemented by files in a browser temp directory on a local drive. In an example of an MP3 player, it might be stored in on-chip memory (either volatile, in which case the cache is built every time the device is switched on, or non-volatile, in which case the cache is built once and then re-used across device boots). Many alternatives are possible as will be appreciated by those skilled in the art.

As further shown in FIG. 3, gateway 308 includes search module 312, cache application 314 and cache 316. These elements can be implemented similarly as the like components in the centralized embodiment illustrated in FIG. 1, with additions and changes that will become apparent from the functional descriptions below. According aspects of the present embodiments to be described in more detail below, FIG. 3 further illustrates how cache 322 and cache 316 together implement a distributed cache 302, as reflected in the distributed cache index 304.

Figure 4A:
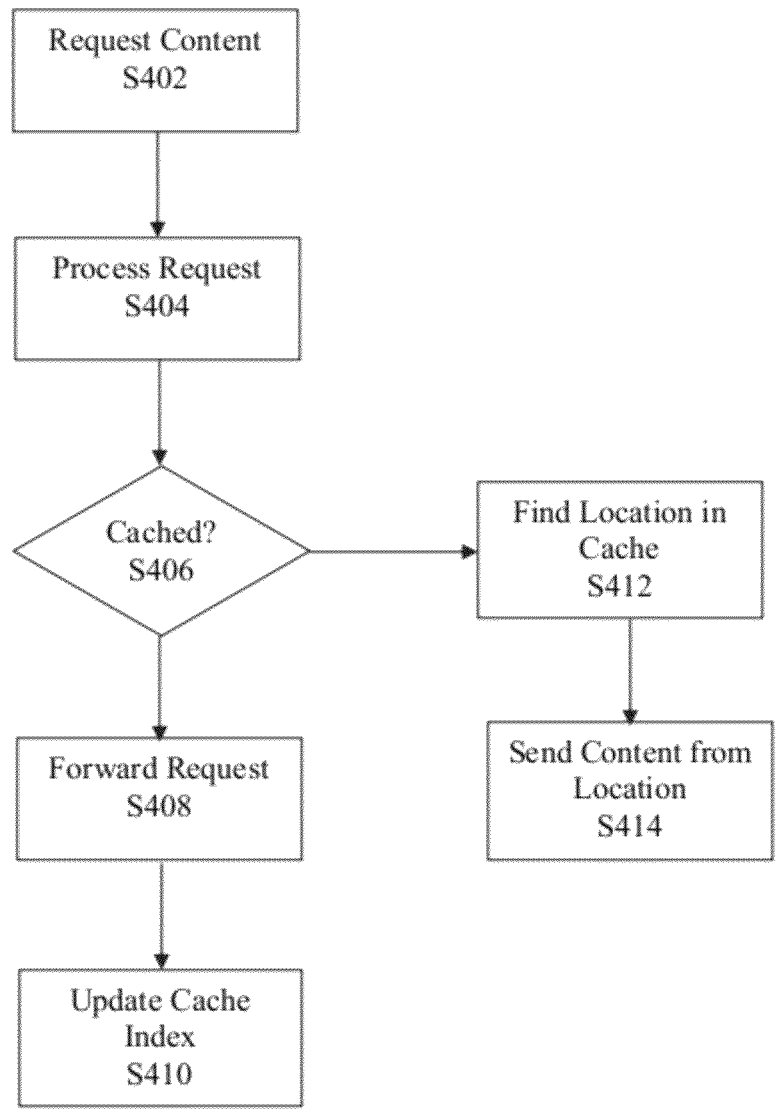
FIGS. 4A and 4B are flowchart illustrating two example distributed caching methodologies according to embodiments of the invention.
Figure 4B:
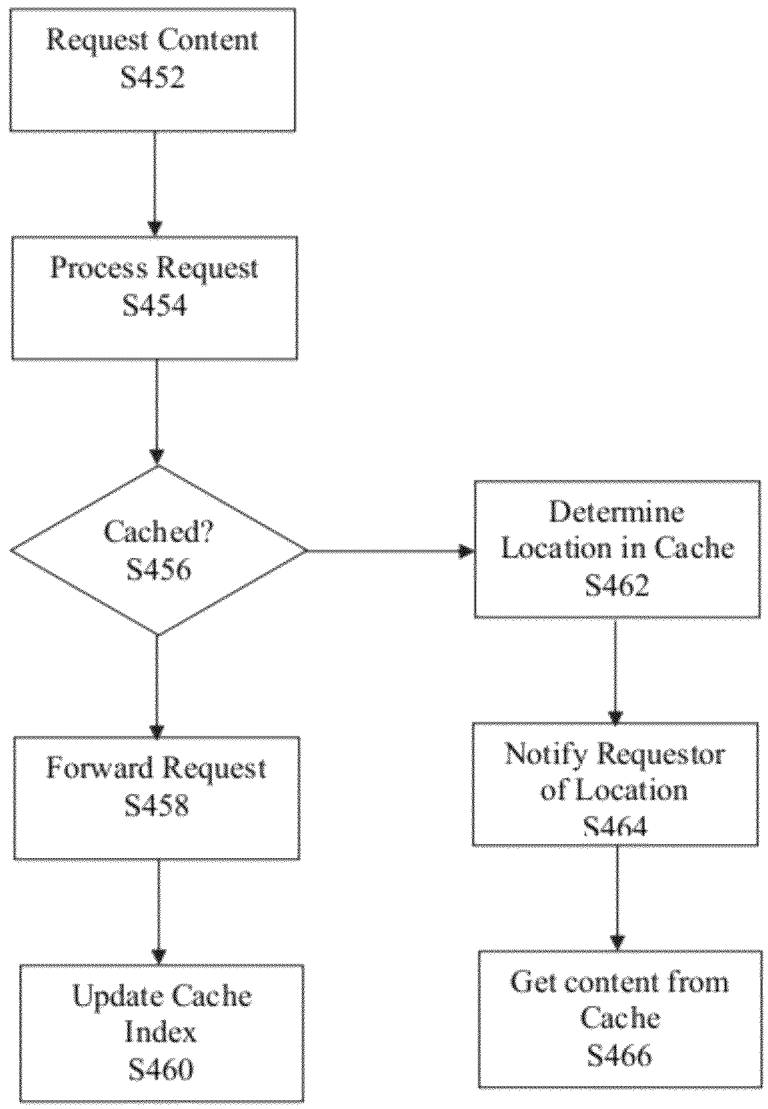

FIGS. 4A and 4B are flowcharts illustrating example distributed cache methodologies according to embodiments of the invention.

The example methodology illustrated in FIG. 4A reflects a client-server model implementation of a distributed cache according to embodiments of the invention.

In step S402, a device 104 requests content, which can include operations similar to those described above in FIG. 2 for step S202. In step S404, the request is processed by the gateway using conventional routing techniques, which can include operations similar to those described above for step S204. For all requests for content (determined in step S404) from a remote source (e.g. a video from a public website such as YouTube), in step S406 search module 312 searches the current cache index 304 to determine whether the requested content is stored in the distributed cache 302.

If the requested content is not cached, the content is obtained in the conventional fashion by forwarding the request to the Internet in step S408. In step S410, after the newly requested content has been downloaded to the device 104 from the Internet, application 314 updates the cache index 304 to reflect the newly stored content as well as its location in the particular device 104 of the distributed cache 302.

If it was instead determined in step S406 that the requested content is available in the distributed cache 302, in step S412 search module 312 further determines the location of the requested content in the distributed cache 302, and in step S414 application 314 causes the requested content to be streamed to device 104 from the distributed cache 302. For example, if the requested content is located in the gateway's cache device 316, application 314 will simply forward the content directly from the device 316. However, if the requested content is located in another device 104, application 314 will communicate with the cache application 320 in the device 104 and cause the device 104 to forward the content from device 104's cache 322. This can be done either by having the content directly transferred by communications between the respective cache applications 320 in devices 104, or via separate communications by cache application 314 with both applications 320.

The example methodology illustrated in FIG. 4B reflects a fully distributed model implementation of a distributed cache according to embodiments of the invention.

In step S452, a device 104 requests content, as in steps S202 and S402 described above. In step S454, the request is processed by the gateway using conventional routing techniques as described in steps S204 and S404 described above. For all requests for content (determined in step S404) from a remote source (e.g. a video from a public website such as YouTube), in step S456 search module 312 searches the current cache index 304 to determine whether the requested content is stored in the distributed cache 302.

If the content is not cached, the content is obtained in the conventional fashion by forwarding the request to the Internet in step S458. In step S460, after the newly requested content has been downloaded to the device 104 from the Internet, application 320 in the requesting device 104 causes the shared cache index 304 to be updated to reflect the newly stored content as well as its location in the particular device 104 of the distributed cache 302. For example, application 320 can be aware of all cache instances that are currently operating, and each instance can store a local copy of the distributed index. After the content is stored, application 320 in the particular device 104 can broadcast a message to all other instances, and in response the instances can update their local copies of the index to reflect the newly stored content.

If it was instead determined in step S456 that the requested content is available in the distributed cache 302, in step S462 search module 312 further determines the location of the requested content in the distributed cache 302, and in step S464 application 314 notifies application 320 that the requested content can be streamed to device 104 from the distributed cache 302, and provides application 320 with the content's location. Application 320 in the requesting device 104 then takes the necessary steps to get the content from the appropriate location in the cache 302. For example, if the requested content is located in the gateway's cache device 316, application 320 will communicate with application 314 to obtain the content from device 316. However, if the requested content is located in another device 104, application 314 will communicate with the cache application 320 in the other device 104 and cause the other device 104 to forward the content from the other device 104's cache 322.

In accordance with various embodiments, the shared-index may be updated whenever the device storing the cached content (e.g., a PC or laptop) is shut down as the content may no longer be accessible.

In some embodiments of a distributed cache according to the invention, it is also possible to migrate cache contents from one device to another device. For some embodiments, content that is often accessed from a "far" device may be moved to a "near" device (for example, to the cache in the gateway, or the cache in a nearby repeater, bridge, router, etc.). A "near" device could, for example, be selected based on the number of hops (e.g. determined by the TTL value in the TCP header info for a particular device), the bandwidth to/from that device (e.g. determined by the signal strength of a device's connection, or whether it is wired or wireless), the latency of the connection, etc.

In a client-server model, the migration functionality described herein can be incorporated in cache application 314, which can periodically determine the need or desirability for migrating cache contents and managing the necessary communications with devices to perform migration between them. In a fully distributed model, each cache instance can monitor migration conditions and coordinate migration actions between themselves. Those skilled in the art will appreciate various further implementation details after being taught by these examples.

In these and other migration embodiments, the contents of one device's cache can be migrated to a central or other cache when the device is powering down. For example, in a fully distributed model implementation, the application 320 can broadcast a message to other cache instances, and the other cache instances can determine whether they have enough storage available, and if so, they can initiate a session that migrates the contents between the devices.

As another example, in a client-server model, application 314 can selectively perform migration between devices 104 using results from various algorithms as described in more detail below. In particular, as shown in FIG. 3, example embodiments of the distributed implementation include a crawling algorithm 352 that is included in gateway 308. This can be configured to search for media within the home network 302. For example, the algorithm "crawls" through the in-home network 102 and updates the distributed index with the information that is available at other locations. For some embodiments, the crawling algorithm also copies/moves selected content between distributed-cache instances, where the content as well as the destination of the move, are selected by an algorithm in application 314.

For example, in these and other embodiments, application 314 may be configured to track per-user preferences. Then, when a specific user logs into a given system, application 314 may be configured to automatically copy content that the user "likes" to an appropriate cache so that the content is available "nearby," thereby enhancing the quality of experience (QoE). This technique would be applicable to both the cache-lookup and the cache-populating mechanisms. It should be noted that in these and other embodiments, for certain users, visiting certain sites/downloading certain content—will not be cached. For example, when a particular user has enabled "incognito mode" on their browser (e.g. in Google Chrome), the ability to cache content can be turned off. Per-user preferences can also include types of content that are never cached. An example of content never cached would be a banking-transaction.

In accordance with these and other embodiments of application 314, users can be given the opportunity to define modifiers or personas for their profile via a user interface application included in device 104. For example, a user can specify whether he typically watches a movie alone (whether at the home office) or with family and/or friends. Moreover, application 314 can determine when desired content is typically requested, and can cache and/or migrate the desired content at times of the day/week when content is cheapest to download from the Internet. For example, an episode of "Survivor" is downloaded at 3:00 am for a user who typically views it every evening at 9:00 pm.

As further shown in FIG. 3, example embodiments of gateway 308 include a monitor module 354 that is configured to monitor the browsing habits of each user and provide granular data analysis. This feature allows the targeting of specific ads to users, among other things. For example, an episode of "Survivor" is downloaded at 3:00 am for a user who typically views it every evening at 9:00 pm.

Figure 5:
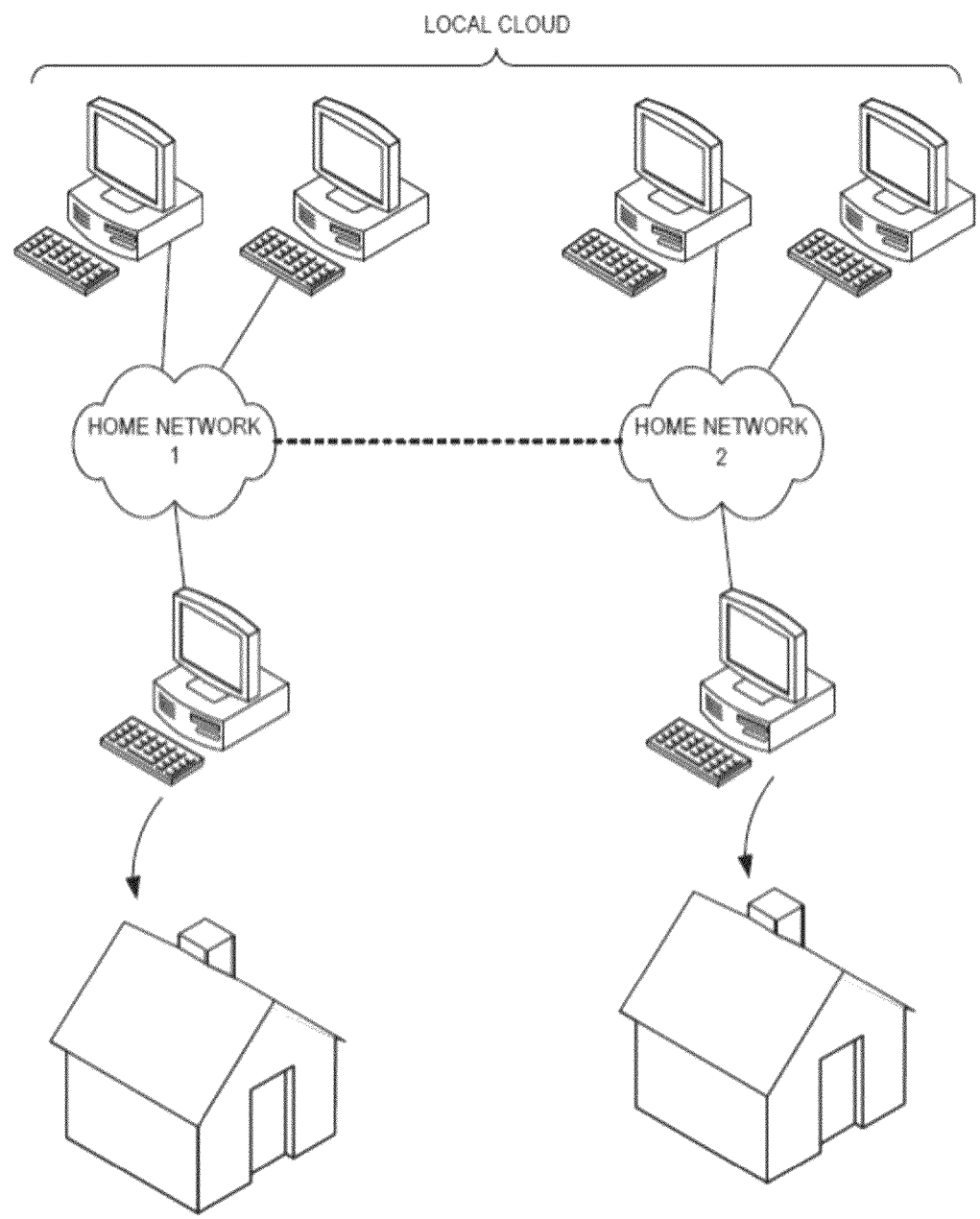
FIG. 5 is a block diagram illustrating an example local cloud that can implement caching techniques according to the invention.

It should be noted that the principles of the invention can be extended beyond a single home network. For example, FIG. 5 shows an example of a local cloud embodiment, where the local cloud comprises the networks in two or more households. The cloud can be formed by networks using a single IP connection and several different wired and/or wireless local networks that use a common gateway. As another example, the cloud can be implemented by gateways that each have their own IP connection and communicate with each other via wired or wireless connections. Those skilled in the art will appreciate various alternative embodiments after being taught by these examples.

In accordance with various cloud embodiments, a local cloud configuration is used for performing the caching techniques described. With a local cloud configuration, services and devices within a single home as well as within one or more "extended" homes (e.g., any participating neighbors, joint-family) may be coupled together. For example, the media library for a group of four homes would be "shared" and available to anyone from those four homes. Note, however, that each home would have its own interne connection and would access services/applications independently as well. For various embodiments, a caching algorithm is used to (a) identify strategic locations (where) within the home (or extended home) that may be used as "hubs" through which information typically passes, and (b) identify what information is stored at which location. The algorithm may also define what content and how much content to be cached at the central hub. These hubs may be embodied as various devices such as repeaters (wired/wireless) as well as other devices (PCs, tablets, gaming-consoles, etc.) within the home.

One non-limiting example of a gateway device 108 and 308 that can be adapted for use with the present invention is described in co-pending U.S. application Ser. No. 13/102,623, the contents of which are incorporated herein in their entirety. Those skilled in the art will be able to understand how to combine the present disclosure with that disclosure to implement example embodiments of the present invention.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method implemented in a network, comprising:
receiving a request to download content from the Internet;
prior to downloading the requested content from the Internet, determining whether the requested content is available in a cache within the network, wherein determining whether the requested content is available in a cache within the network includes determining if the content is stored in a distributed cache in a plurality of different locations within the network;
in response to the request, providing the requested content from one of the cache in the network or from the Internet;
maintaining an index of content within the distributed cache; and
updating the index by crawling the network to search for media in the different locations within the network, wherein the plurality of different locations include various devices in the network,
the method further comprising migrating contents of the distributed cache from one of the devices to another of the devices, wherein migrating includes broadcasting a message from the one of the devices to other of the devices and determining the another of the devices based on whether the another of the devices has enough storage available.

2. The method of claim 1, wherein the devices include one or more of personal computing devices, media devices and networking devices.

3. The method of claim 2, wherein the personal computing devices include one or more of laptop computers, desktop computers, tablet computers, and smart phones.

4. The method of claim 1, further comprising causing each of the devices to execute an instance of a cache-coherency application.

5. The method of claim 4, wherein executing the cache-coherency application includes maintaining a shared version of the index of the distributed cache.

6. The method of claim 4, wherein executing the cache-coherency application includes having access to the index of the distributed cache.

7. The method of claim 1, further comprising identifying strategic locations within the network to migrate contents of the distributed cache.

8. The method of claim 1, further comprising identifying different types of information to be stored at respective different locations within the network.

9. The method of claim 8, further comprising tracking per-user preferences to determine the different types of content to maintain in the cache.

10. The method of claim 9, further comprising automatically copying content to an appropriate device in accordance with the per-user preferences.

11. The method of claim 1, wherein determining whether the requested content is available in a cache within the network includes determining if the content is stored in a distributed cache in a plurality of different locations within the network, as well as within a local cloud comprising one or more additional networks.

12. The method of claim 11, further comprising crawling the network to search for media within the local cloud before downloading content from the Internet.

13. The method of claim 1, further comprising tracking per-user preferences to determine types of content to maintain in the cache.

14. The method of claim 1, further comprising monitoring the browsing habits of users and providing granular data analysis.

15. The method of claim 1, wherein the network consists of an in-home network.

16. The method of claim 1, wherein migrating is automatically performed when the one of the devices is powering down.

17. The method of claim 1, wherein each of the devices is capable of providing requested content from the cache by directly communicating with other devices in which the requested content is stored.

18. The method of claim 1, further comprising automatically updating the index when one of the devices is powering down.

* * * * *

UNITED STATES PATENT AND TRADEMARK OFFICE
CERTIFICATE OF CORRECTION

| | | |
|---|---|---|
| PATENT NO. | : 8,972,517 B2 | Page 1 of 1 |
| APPLICATION NO. | : 13/456113 | |
| DATED | : March 3, 2015 | |
| INVENTOR(S) | : Black et al. | |

It is certified that error appears in the above-identified patent and that said Letters Patent is hereby corrected as shown below:

In the specification

Column 8, Lines 62-63, delete "network 302." and insert -- network 102. --, therefor.

Column 9, Line 55, delete "interne" and insert -- internet --, therefor.

In the claims

Column 11, Line 16, Claim 16, delete "when the one" and insert -- when one --, therefor.

Signed and Sealed this
Third Day of November, 2015

Michelle K. Lee
*Director of the United States Patent and Trademark Office*